US011200811B2

(12) United States Patent
Kwatra

(10) Patent No.: US 11,200,811 B2
(45) Date of Patent: Dec. 14, 2021

(54) INTELLIGENT RECOMMENDATION OF GUIDANCE INSTRUCTIONS

(71) Applicant: INTERNATIONAL BUSINESS MACHINES CORPORATION, Armonk, NY (US)

(72) Inventor: Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 16/054,731

(22) Filed: Aug. 3, 2018

(65) Prior Publication Data
US 2020/0043355 A1 Feb. 6, 2020

(51) Int. Cl.
*G09B 5/06* (2006.01)
*G09B 19/24* (2006.01)
*G06Q 10/06* (2012.01)
*G06F 16/951* (2019.01)

(52) U.S. Cl.
CPC ............ *G09B 5/065* (2013.01); *G06F 16/951* (2019.01); *G06Q 10/0633* (2013.01); *G09B 19/24* (2013.01)

(58) Field of Classification Search
CPC ....... G09B 5/065; G09B 19/24; G06F 16/951; G06Q 10/0633; G06Q 50/20; G06Q 10/20; G16Y 40/40
USPC ........................................................ 434/365
See application file for complete search history.

(56) References Cited

U.S. PATENT DOCUMENTS

| 6,262,730 | B1 * | 7/2001 | Horvitz ................. G06N 5/00 715/707 |
| 8,373,618 | B2 | 2/2013 | Friedrich et al. |
| 9,406,170 | B1 | 8/2016 | Grampurohit et al. |
| 9,697,432 | B2 | 7/2017 | Bastide et al. |
| 9,760,806 | B1 * | 9/2017 | Ning ................. G06N 3/0454 |
| 9,791,917 | B2 | 10/2017 | Kamhi et al. |
| 9,870,717 | B2 | 1/2018 | Subramaniam |
| 9,898,654 | B2 | 2/2018 | Castelli et al. |
| 10,102,855 | B1 * | 10/2018 | Sindhwani ............ G06F 40/134 |
| 2008/0126168 | A1 * | 5/2008 | Carney ............ G06Q 10/06316 705/7.26 |
| 2013/0061138 | A1 | 3/2013 | Spector |
| 2013/0236872 | A1 * | 9/2013 | Laurusonis .......... G09B 23/285 434/262 |

(Continued)

OTHER PUBLICATIONS

Limbu et al., "Supporting Training of Expertise with Wearable Technologies: The WEKIT Reference Framework," Mobile and Ubiquitous Learning, Nov. 18, 2017 (14 pages).

(Continued)

*Primary Examiner* — Robert P Bullington
*Assistant Examiner* — Stephen Alvesteffer
(74) *Attorney, Agent, or Firm* — Griffiths & Seaton PLLC

(57) ABSTRACT

Embodiments for providing intelligent recommendation of guidance instructions to a user by a processor. A user may be cognitively recognized performing a selected task on an item using one or more Internet of Things ("IoT") computing devices. One or more guidance instructions may be provided/suggested for assisting with performing the selected task according to identified contextual factors. The user may be cognitively guided to perform the selected task using the one or more guidance instructions.

20 Claims, 8 Drawing Sheets

(56) References Cited

U.S. PATENT DOCUMENTS

| | | | |
|---|---|---|---|
| 2014/0349257 A1* | 11/2014 | Connor | G16H 20/60 |
| | | | 434/127 |
| 2015/0019342 A1* | 1/2015 | Gupta | G06Q 30/0269 |
| | | | 705/14.66 |
| 2016/0372005 A1* | 12/2016 | Bajpai | G09B 19/0092 |
| 2017/0172674 A1 | 6/2017 | Hanuschik et al. | |
| 2017/0323062 A1 | 11/2017 | Djajadiningrat et al. | |
| 2017/0360404 A1 | 12/2017 | Gafner et al. | |
| 2018/0012411 A1* | 1/2018 | Richey | G06T 19/006 |
| 2018/0060663 A1 | 3/2018 | Baskin et al. | |
| 2018/0089870 A1 | 3/2018 | Billi-Duran et al. | |
| 2018/0165978 A1* | 6/2018 | Wood | G09B 5/02 |
| 2018/0268375 A1* | 9/2018 | Passila | G06F 15/177 |
| 2018/0322393 A1* | 11/2018 | Pau | G06N 3/088 |
| 2018/0336045 A1* | 11/2018 | Badr | G06F 16/951 |

OTHER PUBLICATIONS

Silva Filho et al., "Using Wearable and Contextual Computing to Optimize Field Engineering Work Practices," Human Interface and the Management of Information, Information and Knowledge in Context, Jul. 21, 2015 (12 pages).

Funk et al., "Working with Augmented Reality? A Long-Term Analysis of In-Situ Instructions at the Assembly Workplace," ACM PETRA '17, Jun. 21-23, 2017 (9 pages).

Henderson et al., "Evaluating the Benefits of Augmented Reality for Task Localization in Maintenance of an Armored Personnel Carrier Turret," IEEE International Symposium on Mixed and Augmented Reality, 2009 Science and Technology Proceedings, Oct. 19-22, 2009 (10 pages).

\* cited by examiner

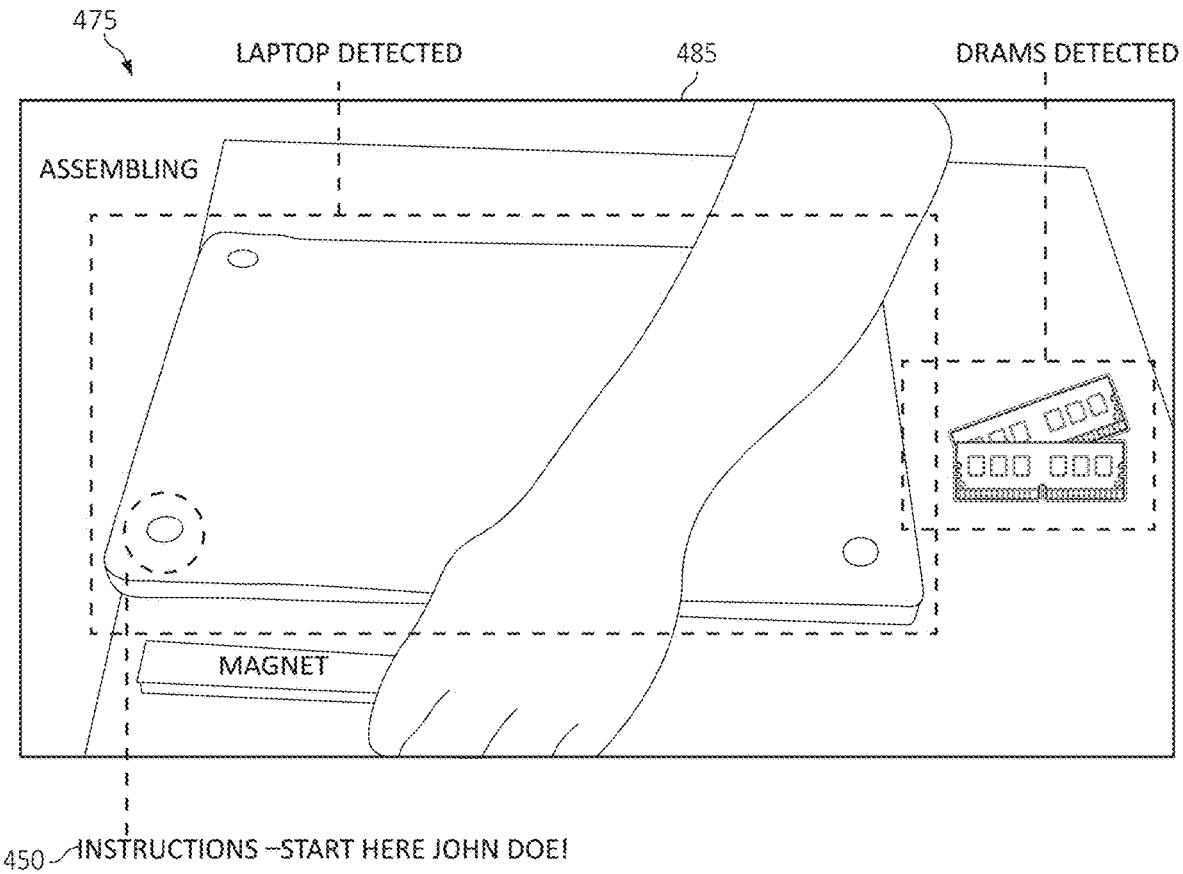

A.I.SHA: WOULD YOU LIKE ME TO GIVE YOU INSTRUCTIONS TO CHANGE RAM IN YOUR LAPTOP?

JOHN DOE: YES PLEASE, A.I.SHA!

A.I.SHA: REMOVE THE SCREWS (BASED ON WHERE I AM POINTING IN MY SCREEN OR YOU CAN JUST FOLLOW MY AUDIO LISTENING FEATURE AT YOUR OWN PACE AND THEN WE CAN PROCEED. RELAX, WE HAVE TIME!

A.I.SHA (SPEAKING INTERNALLY): I'LL PAUSE FOR SOME TIME AND KEEP DISPLAYING CURRENT STEPS OR GUIDING YOU THROUGH MY AUDIO/VISUALS UNTIL YOU COMPLETE THAT OPERATION: (CALCULATING TIME  NTIL USER IS DONE WITH THE FIRST STEP)

A.I.SHA - (NEXT SET OF INSTRUCTIONS): I ALSO SEE THE MAGNET WHERE YOU CAN PUT THE SCREWS. ONCE YOU ARE DONE WITH THIS STEP, I WILL PROCEED TO SHOW YOU WITH PROPER HIGHLIGHTING (OR IN AUDIO FORM), WHAT TO DO NEXT.

FIG. 4B

INTELLIGENT RECOMMENDATION OF GUIDANCE INSTRUCTIONS

BACKGROUND OF THE INVENTION

Field of the Invention

The present invention relates in general to computing systems, and more particularly to, various embodiments for intelligent recommendation of guidance instructions to a user by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments for providing intelligent recommendation of guidance instructions to a user using one or more processors, are provided. In one embodiment, by way of example only, a method for cognitively recommending a set of guidance instructions to accomplish a task, again by a processor, is provided. A user may be cognitively recognized performing a selected task on an item (e.g., fixing/repairing or assembling the item) using one or more Internet of Things ("IoT") computing devices. One or more guidance instructions may be provided/suggested for assisting with performing the selected task according to identified contextual factors. The user may be cognitively guided to perform the selected task using the one or more guidance instructions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
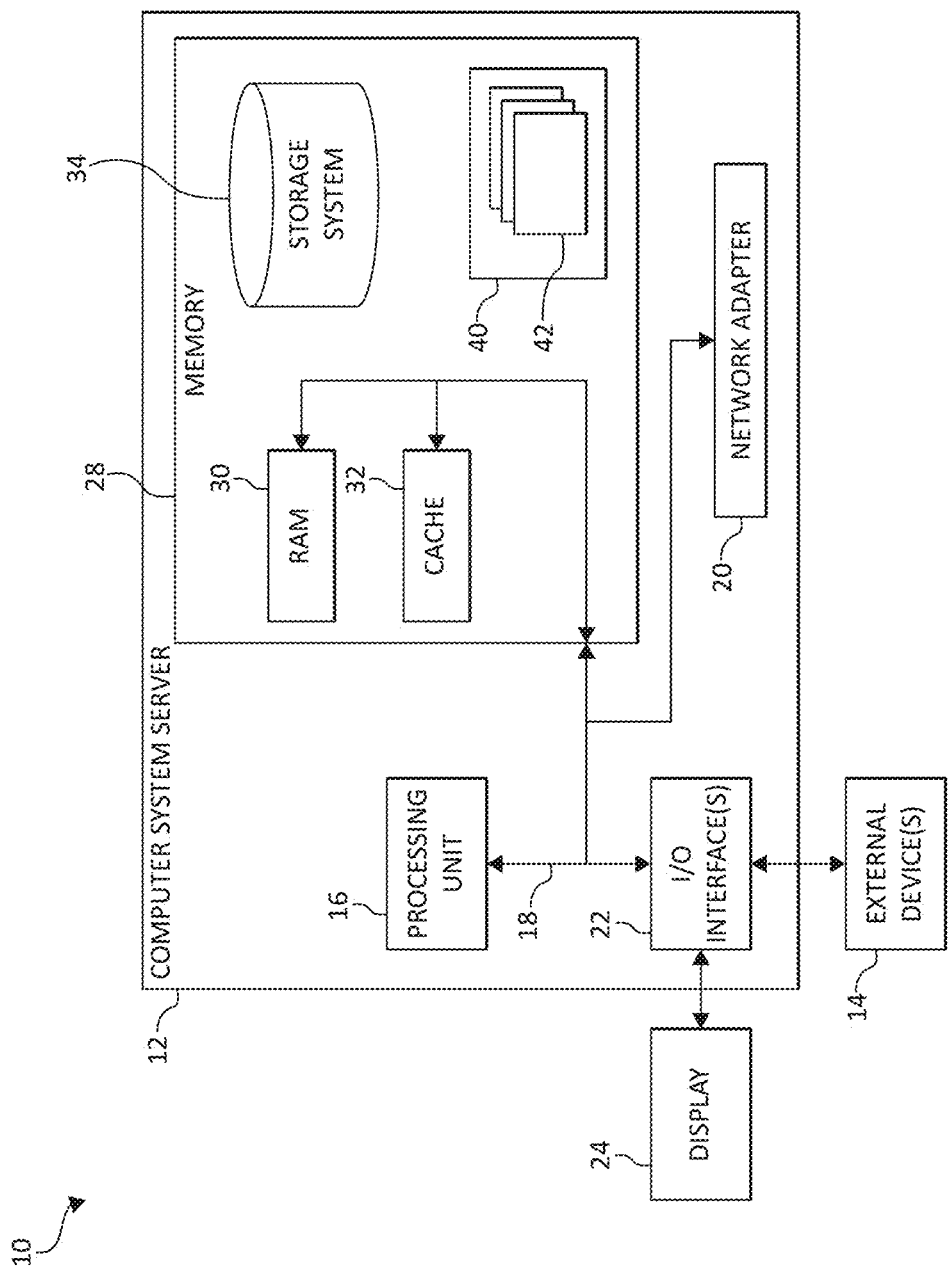
FIG. 1 is a block diagram depicting an exemplary computing node according to an embodiment of the present invention.

Computing systems may include large scale computing called "cloud computing," in which resources may interact and/or be accessed via a communication system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses to a user such as, for example, a medical patient. For example, often, when a particular item needs to be assembled and/or repaired (e.g., an electronic device, wooden assembly, a plumbing task, etc.) and there is limited knowledge pertaining to assembly and/or repair, a subject matter expert is often summonsed to perform the task. Alternatively, attempts are made by a user themselves to perform the tasks. However, considering the user has limited knowledge about assembling/repairing the item, the user often times becomes frustrated, angry, and/or confused in performing the task. This is often an iterative process and user ends up spending unnecessary time in a reckless state without correctly assembling/repairing the item.

Accordingly, the present invention provides smart guidance system which can detect the real-time activity being performed by a user, fetch/retrieve one or more useful guidance instructions from one or more trusted sources, and then cognitively guide the user via step-by-step guidance instructions to complete the task.

In an additional aspect, the present invention provides for cognitively recommending a useful set of guidance instructions to accomplish a task such as, for example, assembling and/or repairing an item/object. A selected task being performed by a user on an item/object may be cognitively recognized (e.g., fixing/repairing or assembling the item) using one or more IoT computing devices.

The term "usefulness" or "useful" as used herein may refer to one or more actions having a positive impact upon assembling, repairing, and/or performing one or more actions, and/or efforts in relation to a selected task. Useful may be generally defined as the ability to be used for a practical purpose, capable of being put to use, serviceable for an end or purpose, and/or having value or productivity. It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more medium/means. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
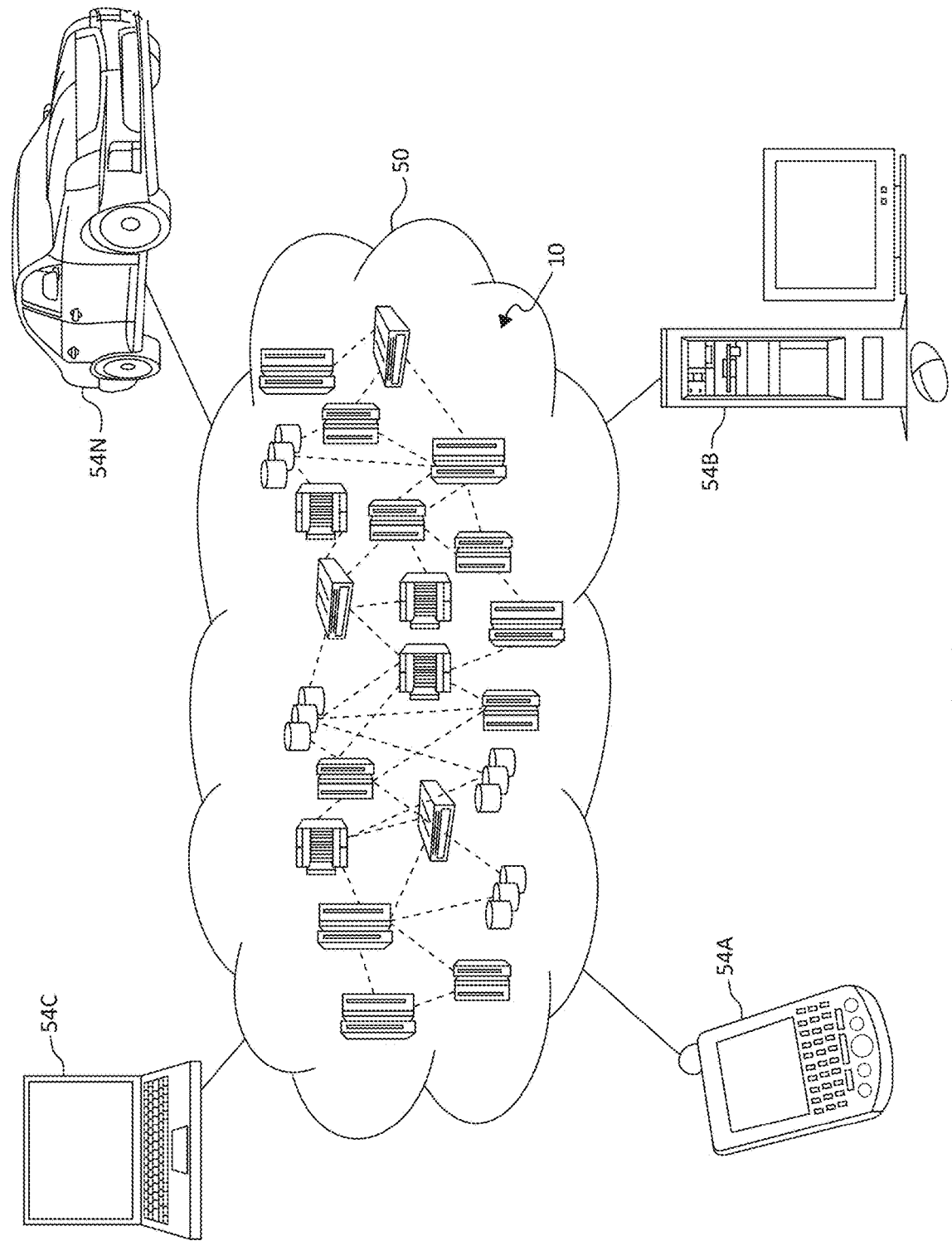
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
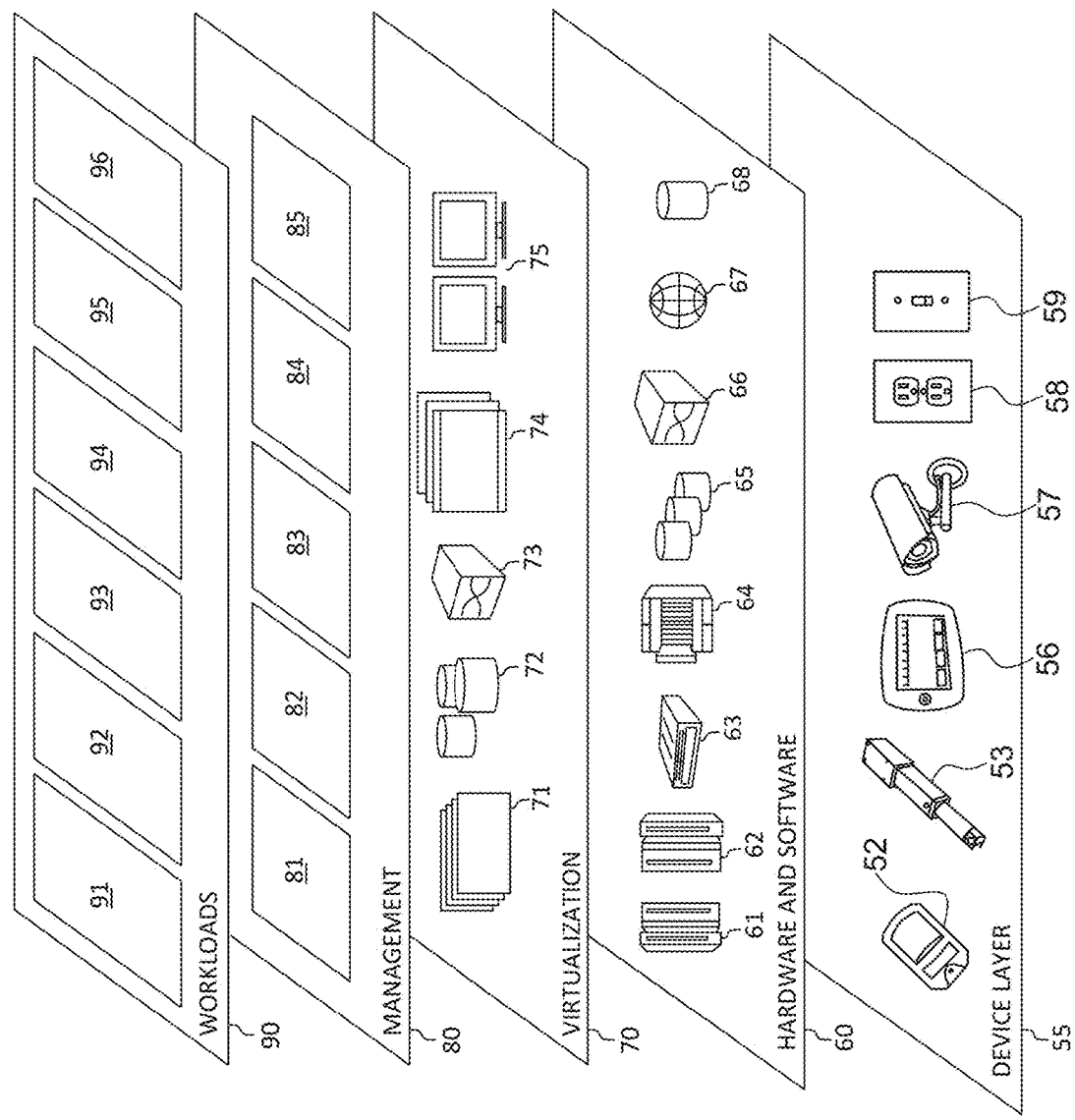
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent recommendation of guidance instructions. In addition, workloads and functions 96 for intelligent recommendation of guidance instructions may include such operations as data analytics, data analysis, and as will be further described, notification functionality. One of ordinary skill in the art will appreciate that the workloads and functions 96 for intelligent recommendation of guidance instructions may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As stated above, the present invention provides a novel solution for intelligent recommendation of guidance instructions. A cognitive system fetches instructional steps or videos from the cloud database or corpus. Once the retrieval operation is performed, the cognitive system may monitor in real-time, current activities performed by a user in order to cross verify the instructional steps based on the contextual situation and the actions associated with the item/object. Based on the monitoring, the cognitive system automatically pauses, stops, and/or provides additional audio data, text data, and/or video data (e.g., visual aids) when the user is unable to perform one or more steps of the instructional steps (e.g., stuck at a particular step). The cognitive system detects that the user is stuck (unable to continue performing a step or next step) and attempts to locate additional information from one or more ranked sources (e.g., a first data source such as an online search engine, a second data source such as a website or audio/video sharing website, a text based website such as a web-based encyclopedia/dictionary) that may guide the user through the process in a further granular form. The cognitive system may collect and gather user's inputs in relation to each step/task (either manual driven or automatically detected). Upon the user successfully completing a specific step/stage of the instructions, a next step/stage of the instructions may be provided.

For example, an intelligent recommendation of guidance instructions service may analyze and detect an activity being performed in real-time by the user on an object (e.g., a computer). The user can point to a specific object for a camera device to detect and/or bring the specific item to be assembled or repaired in front of the camera lens of an IoT computing device. A neural network operation may be performed on the captured video/image of the scene in order to recognize the object. The neural network may divide the image into regions and predicts bounding boxes (e.g., "predicting boundaries" for each region) and probabilities for each region. For example, a virtual (dotted) box may be created around the image while processing by camera scanning system to understand what is being observed (e.g., object recognition by machine learning and using video analytics). These bounding boxes may be weighted by one or more predicted probabilities (e.g., probability of correctly identifying a device which has been enclosed in a certain boundary while recording the activities of the user engaged with a certain device such as, for example, cycle repair, laptop repair, microwave device repair, cooking items etc.).

The intelligent recommendation of guidance instructions service may perform real-time detection on an IoT device (e.g., personal digital assistant (PDA) or cellular telephone 54A, desktop computer 54B, laptop computer 54C, and/or automobile computer system 54N of FIG. 2). The real-time detection may be performed by running machine learning operations with a parallel computing platform and application programming interface "API" (e.g., CUDA) and open source computer vision ("OpenCV"). The visual analysis generates label files that a machine learning operation uses and models that may be trained accordingly in order to identify the objects or items in space. Once the item has been detected and recognized, the intelligent recommendation of guidance instructions service may record/store in a database the activity of the user. Feature matching of the object/item in space with the set of instructions associated with assembling or repairing an item (e.g., either pre-loaded at the time of creation and increasing the database as the intelligent recommendation of guidance instructions service evolves or loaded at run-time in real time based on the contextual situation) are fetched from the cloud database in a sequential form. That is, a machine learning operation may provide two components: 1) feature extraction that identifies features (via pixel by pixel understanding) of a particular object in a space (e.g., laptop) and 2) feature matching for matching or correlating the object with a known library of objects in the database. For example, the machine learning operation may learn and understand, via IoT sensor feeds/camera, the objects/items being observed (e.g., DRAMS, laptop, bicycle, screw driver etc.) and then the respective features (vectored matrix) may be extracted based on color, type, size etc. and then matched or correlated with known objects to classify the object properly.

An IoT device may detect or monitors the user's activity in order to inspect the progress of the specific user. A Visual Surveillance and Monitoring ("VSAM") operation can be used in order to detect the progress of the user. VSAM with automated video understanding operations may allow a network of active video sensors to automatically monitor objects and events. A machine learning component may also perform a syntactic and semantic analysis in order to re-organize the instructions. A device inculcated with a back-end corpus of the items detected in space and instructional aid will act as an instructional kit to guide the user through the process and also tell the user where the user made mistakes. The information parsed via the machine learning component to the user and provided in a sequential form can be based on information obtained one or more ranked sources based on micro-tracking the user's activity. One or more mistakes committed by the users can be stored in the feature matching operation in order to trigger or activate the mistaken steps before the actual steps so that the user keeps track of the correct instructions or steps to be executed. That is, if the user commits certain mistakes (e.g., skipping some steps or proceeding incorrectly with repairing something), then feature matching system, which is a part of monitoring user's activities correlating with ideal activity to be performed while fixing or repairing something (e.g., continuous software polling being performed by monitoring the user's activity and the preferred way of doing the activity), may calculate a threshold deviation from ideal way of performing the activity or completing a certain task and then corrective actions can be provided to the user by interjecting at a certain point and guiding the user with a modified set of instructions.

Turning now to FIG. 4A-4B, are block diagrams depicting exemplary functional components 400 and 475 according to various mechanisms of the illustrated embodiments is shown. In one aspect, each of the devices, components, modules, and/or functions described in FIGS. 1-3 may also apply to the devices, components, modules, and functions of FIG. 4A-4B. Also, one or more of the operations and steps of FIGS. 1-3 may also be included in one or more operations or actions of FIG. 4A-4B. Computer system/server 12 is again shown, which may incorporate an intelligent service 402 or "intelligent recommendation of guidance instructions service 402" (e.g., an Artificial Intelligence Simulated Humanoid Assistant "A.I.S.H.A.").

As illustrated in FIG. 4A, in one aspect, the computer system/server 12 may provide virtualized computing services (i.e., virtualized computing, virtualized storage, virtualized networking, etc.) to one or more computing devices, as described herein. More specifically, the computer system/server 12 may provide virtualized computing, virtualized storage, virtualized networking and other virtualized services that are executing on a hardware substrate.

Figure 4:
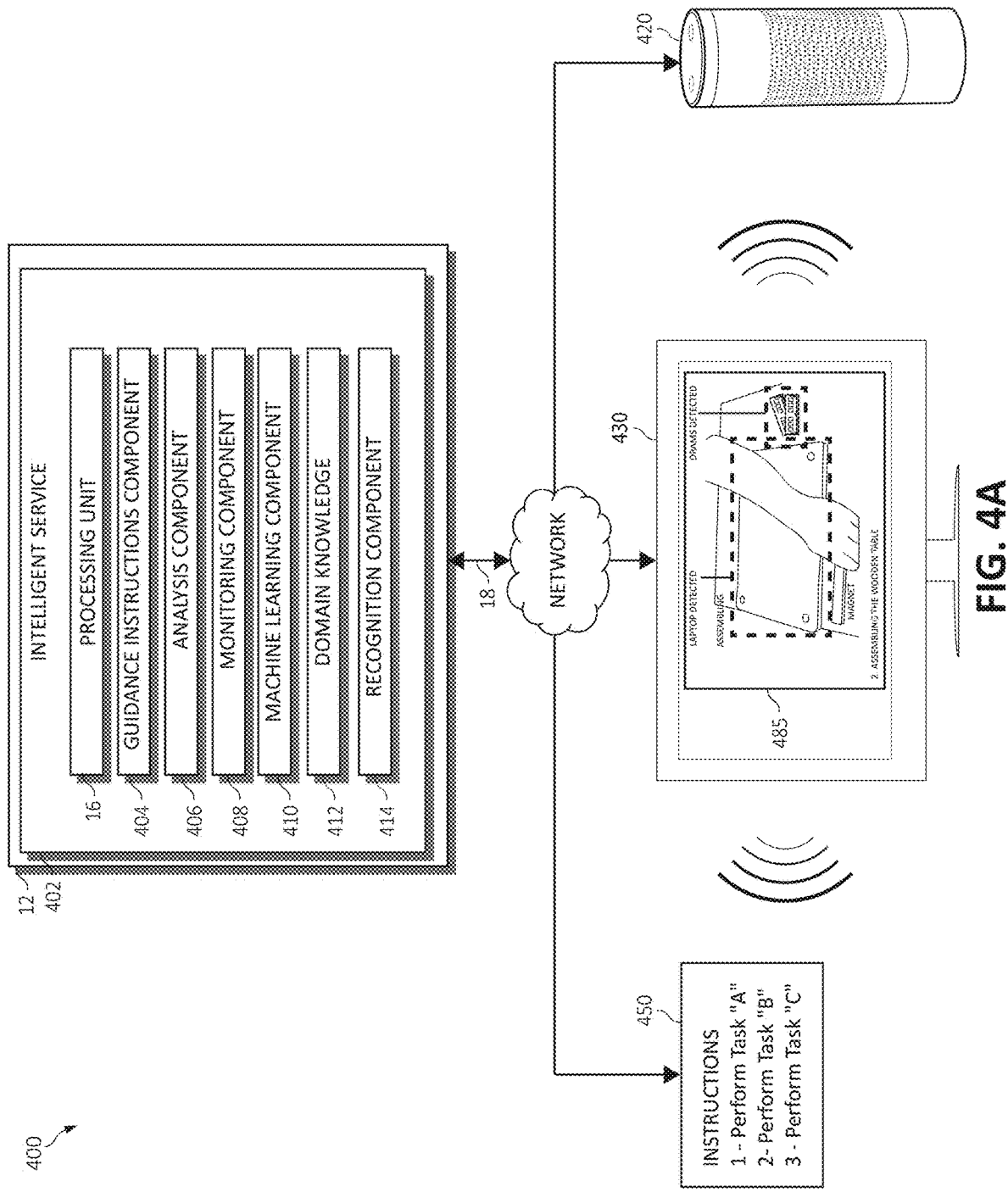
FIGS. 4A and 4B are additional block diagrams depicting an exemplary functional relationship between various aspects of the present invention.

The intelligent service 402 (e.g., intelligent recommendation of guidance instructions service 402) depicted in FIG. 4 may be in communication with and/or association with one or more computing devices such as, for example, a voice activated hub 420 (e.g., an personal assistant IoT computing device), and/or IoT computing device 430 (e.g., a camera, television, smart phone, desktop computer, laptop computer, tablet, smart watch and/or another electronic/wireless communication device that may have one or more processors, memory, and/or wireless communication technology for displaying/streaming audio/video data).

The intelligent recommendation of guidance instructions service 402, the voice activated hub 420, and the IoT computing device 430 may each be associated with and/or in communication with each other, by one or more communication methods, such as a computing network, wireless communication network, or other network means enabling communication (each collectively referred to in FIG. 4 as "network 18"). In one aspect, the intelligent recommendation of guidance instructions service 402 may be installed locally on the voice activated hub 420 and/or the IoT computing device 430. Alternatively, the intelligent recommendation of guidance instructions service 402 may be located external to (e.g., via a cloud computing server) the voice activated hub 420 and/or the IoT computing device 430.

The intelligent recommendation of guidance instructions service 402 may incorporate processing unit 16 to perform various computational, data processing and other functionality in accordance with various aspects of the present invention. A domain knowledge 412 (e.g., a database that may include an ontology) is shown, along with a guidance instructions component 404, an analysis component 406, a monitoring component 408, a machine learning component 410, and/or a recognition component 414.

The domain knowledge 412 may include and/or be associated with an ontology of concepts, keywords, expressions representing a domain of knowledge. A thesaurus or ontology may be used as the database and may also be used to identify semantic relationships between observed and/or unobserved variables by the machine learning component 410 (e.g., a cognitive component). In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge 412 may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In an additional aspect, the analysis component 406 of the computer system/server 12 may work in concert with processing unit 16 to accomplish various aspects of the present invention. For example, analysis component 406 may undergo various data analytics functions to analyze data communicated from one or more devices such as, for example, the voice activated hub 420 and/or the IoT computing device 430.

The analysis component 406 may receive and analyze each physical property associated with media data (e.g., audio data and/or video data). The analysis component 406 may cognitively receive and/or detect audio data and/or video data for the guidance instructions component 404.

The analysis component 406, the monitoring component 408, and/or the machine learning component 410 may access and monitor one or more audio data sources and/or video data sources (e.g., website, audio storage systems, video storage systems, cloud computing systems, etc.) to provide the audio data, video data, and or text data for providing guidance instructions for performing a task. The analysis component 406 may cognitively analyze the data retrieved from the domain knowledge 412, one or more online sources, a cloud computing system, a text corpus, or a combination thereof. The analysis component 406 and/or the machine learning component 410 may extract one or more keywords, phrases, instructions, and/or transcripts (e.g., transcribe audio data into text data) using natural language processing ("NLP").

The monitoring component 408 may monitor performance of the one or more guidance instructions while performing the selected task. The recognition component 414 may recognize a user performing a selected task on an item using the voice activated hub 420 and/or the IoT computing device 430. For example, the voice activated hub 420 and/or the IoT computing device 430 and/or other IoT devices such as, for example, computing devices used by cloud consumers, such as, for example, personal digital assistant (PDA) or cellular telephone 54A, desktop computer 54B, laptop computer 54C, and/or automobile computer system 54N of FIG. 2, may identify one or more activities, bodily movements and/or features (e.g., facial recognition, facial expressions, hand/feet gestures, etc.), behaviors, audio data (e.g., voice detection and/or recognition), environmental surroundings, or other defined parameters/features that may identify, locate, and/or recognize a user and/or a task being performed by the user.

As part of detecting the data, the analysis component 406, the monitoring component 408, and/or the machine learning component 410 may identify, from one or more sources audio data, video data, text data, and/or contextual factors associated with the audio data, video data, and/or text data, or a combination thereof. Also, the machine learning component 410 may initiate a machine learning operation to learn the contextual factors associated with the audio data, video data, and/or text data associated with guidance instructions for performing a task such as, for example, assembling and/or fixing/repairing an item (e.g., assembling a new bicycle or fixing a computer).

The guidance instructions component 404 may provide one or more guidance instructions 450 for assisting with performing the selected task according to identified contextual factors. The guidance instructions 450 may be text data, audio data, and/or video data. For example, the voice activated hub 420 may audibly communicate the guidance instructions 450. The IoT computing device 430 may visually provide the guidance instructions 450 as illustrated as in image/video data 485 of a graphical user interface ("GUI") of the IoT computing device 430.

The guidance instructions component 404 may cognitively guide the user to perform the selected task using the one or more guidance instructions 450. The guidance instructions component 404 may provide a sequence of guidance instructions retrieved from a domain knowledge, one or more online sources, a cloud computing system, a text corpus, or a combination thereof. The guidance instructions component 404 may provide media data from one or more online sources, a cloud computing system, or a combination thereof.

The guidance instructions component 404 may verify each step of the one or more guidance instructions for assisting with performing the selected task. The guidance instructions component 404 may also identify a level of difficulty (e.g., a level of stress, frustration, anxiety, excitability, or other emotional responses) by the user in performing a set of tasks associated with the one or more guidance instructions delivered via streamed media, pause/stop/terminate delivery of the streamed media for a selected period of time, and/or provide the user with a modified set of guidance instructions to guide the user through an enhanced level of instructions.

The guidance instructions component 404 may provide additional guidance information relating to the guidance instructions collected from a domain knowledge, one or more online sources, a cloud computing system, a text corpus, or a combination thereof for performing the selected task. For example, if a first set of instructions are insufficient for the user, an additional set that may further explain one or more of the original instructions may be provided.

The intelligent recommendation of guidance instructions service 402 may adjust a tone, volume, pace of the speech and/or frequency of the guidance instructions audio/media data based on the speed/pace of a user following the guidance instructions. Also, words, phrases, and/or compete sentences (e.g., all or portions of a conversation) by other parties relating to the audio data may be transcribed in a text form based on an NLP extraction operation (e.g., NLP based keyword extraction). The text data may be relayed, sent, stored, or further processed so that the same audio/video data (e.g., all or portions of the conversations) may be heard or listened to while simultaneously providing the text version of the guidance instruction.

As previously indicated, the intelligent recommendation of guidance instructions service 402 may also communicate with other linked devices such as, for example, the voice activated hub 420 and/or the IoT computing device 430. Moreover, the analysis component 406 and/or the machine learning component 410 may even access one or more online data sources such as, for example, a social media network, website, or data site for providing one or more guidance instructions for assisting with performing the selected task according to identified contextual factors. That is, the analysis component 406, the recognition component 414, and/or the machine learning component 410 may learn and observe, for a user, a degree or level of attention, a level difficulty by a user in performing a task, a type of response, and/or feedback as to various topics and/or guidance instructions. The learned and observed behavior of the user may be linked to various data sources that provide personal information, social media data, or user profile information to learn, establish and/or determine a confidence factor relating to the performance of the guidance instructions.

In one aspect, the machine learning component 410, as described herein, may be performed by a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the intelligent recommendation of guidance instructions service 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.) Thus, as used herein, a calculation operation may include all or part of the one or more mathematical operations.

In one aspect, if the activity that the user wants to perform is initially unable to be detect, a user may provide (e.g., verbally via the voice activated hub 420 and/or via an interactive GUI interface of the IoT computing device 430) activity data into the intelligent recommendation of guidance instructions service 402 as an input so that the intelligent recommendation of guidance instructions service 402 may start with object scanning, instruction scanning (after downloading into the corpus if it hasn't done already) and guiding the step-by-step instructions to the user based on monitoring the activity of the user.

Turning now to FIG. 4B, consider the following exemplary use case. As previously stated, guidance instructions component 404 may provide one or more guidance instructions 450 for assisting with performing a selected task such as, for example, changing random access memory ("RAM") in laptop. The guidance instructions 450 may be text data, audio data, and/or video data. For example, the IoT computing device 430 may visually provide the guidance instructions 450 as illustrated as in the image/video data 485 with visual aids such as, for example, "laptop detected," "dynamic "DRAM" detected," and instructions 450 pointing to the image/video data 485.

For changing the RAM in a laptop, step 1) step-by-step guidance instructions 450 for taking out the RAM and changing the RAM of the computer may be provided. In step 2) relevant steps may be automatically accessed/identified on a web-based encyclopedia/dictionary or similar ranked platform and the information may be stored in the domain knowledge 412 (or corpus or). In step 3) the voice activated hub 420 and/or the IoT computing device 430 may provide micro-instructional assistance. In step 4) Audio or visual aids on image/video data 485 may be provided to the user at every step and pauses while the user operates through that particular step. Thus, as illustrated in FIG. 4B, the voice activated hub 420 and/or the IoT computing device 430 may provide an interactive dialog with a user (e.g., "John Doe") for providing the guidance instructions 450.

Figure 5:
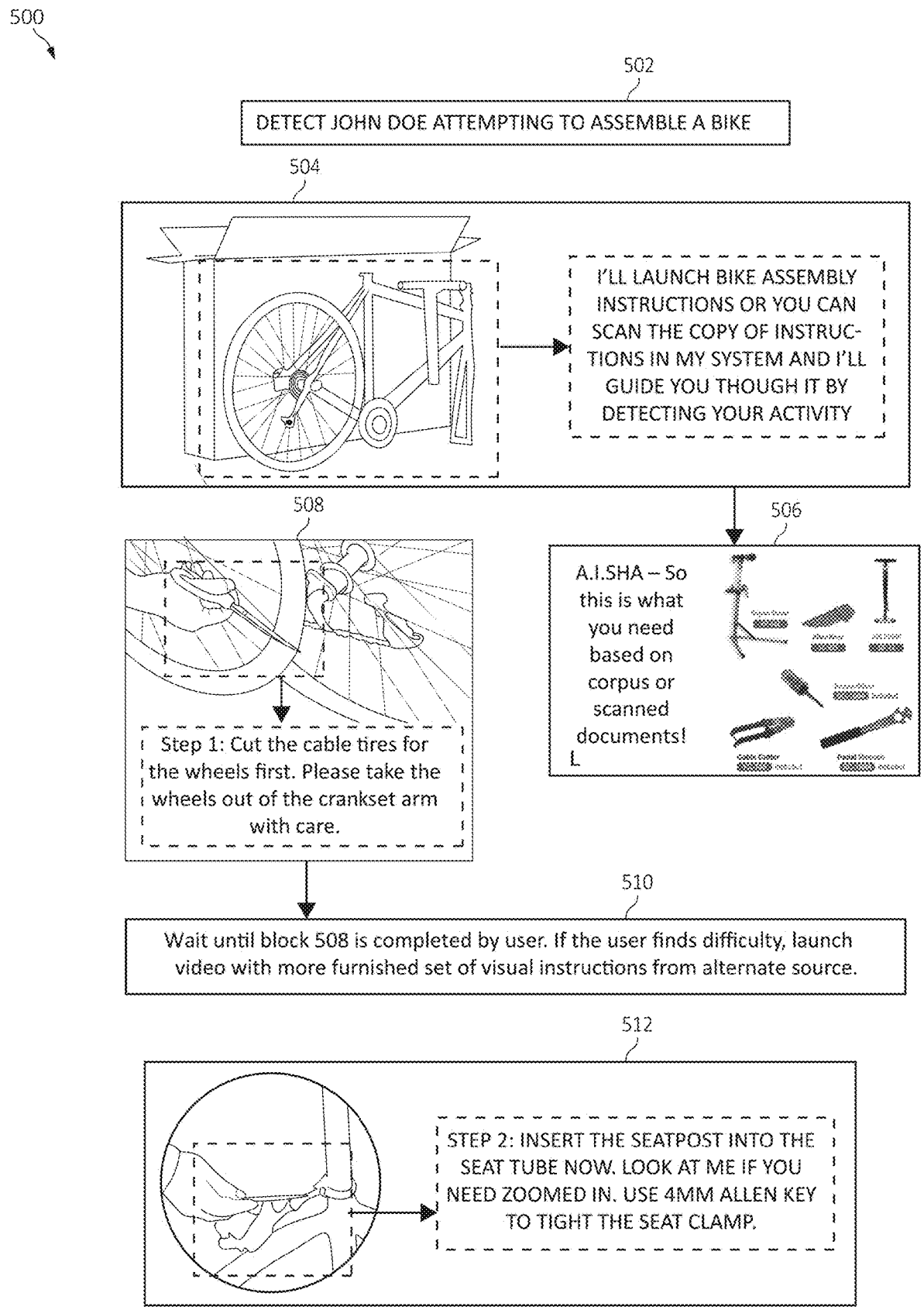
FIG. 5 is an additional block diagram depicting use of intelligent recommendation of guidance instruction system in an Internet of Things (IoT) computing environment in which aspects of the present invention may be realized.

Turning now to FIG. 5, a block diagram of exemplary functionality 500 relating to an intelligent recommendation of guidance instructions service is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4A-4B. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks.

As a preliminary matter, FIG. 5 illustrates the intelligent recommendation of guidance instructions for assembling a bicycle. Starting with block 502, one or more IoT computing devices may recognize a user performing a selected task on an item (e.g., "detect John Doe attempting to assemble a bike") and display the recognized user and task via an image. A message may be communicated, via one or more IoT devices such as, "I'll launch bike assembly instructions or you can scan a copy of instructions in the system (e.g., intelligent recommendation of guidance instructions system) and I'll guide you though it by detecting your activity," as in block 506. In block 506, a list of items needed for performing the task may be provided according to a search operation on one or more resources such as, for example, "A.I.S.H.A: So, this is what you need based on a corpus or scanned documents! Let's proceed."

In block 508, a video image of instructions (e.g., step 1) may be provided along with the instructions as text data displayed on an IoT device and/or the instructions audibly communicated via an IoT device such as, for example, "Step 1" cut the cable tires for the wheels first. Please take the wheels out of the crankset arm with care." Also, intelligent recommendation of guidance instructions service may wait until the user completes the instructions of block 508. Also, if the user is having difficulty performing the task (e.g., step 1 instructions), an additional video/instructions may be launched with one or more furnished sets of visual instructions from an alternative source as additional aids for accomplishing the particular step/instruction the user is having difficulty in performing.

Upon completion of block 510, a second video image of an instructions (e.g., step 2) may be provided along with the instructions as text data displayed (and/or audibly communicated) on an IoT device and/or the instructions audibly communicated via an IoT device such as, for example, "Step 2: Insert the seat post into the seat tube now. Look at me if you need the image to be zoomed in. Use a 4 mm Allen key to tighten the seat claim" As indicated, the instructions may also provide hints or additional actions/bodily gestures (e.g., a request for the user to look at the IoT device to indicate a particular action needed by the user such as, for example, the IoT device zooming in on the video image). Thus, the present invention may cognitively guide the user to perform the selected task using the one or more guidance instructions at a granular level.

Figure 6:
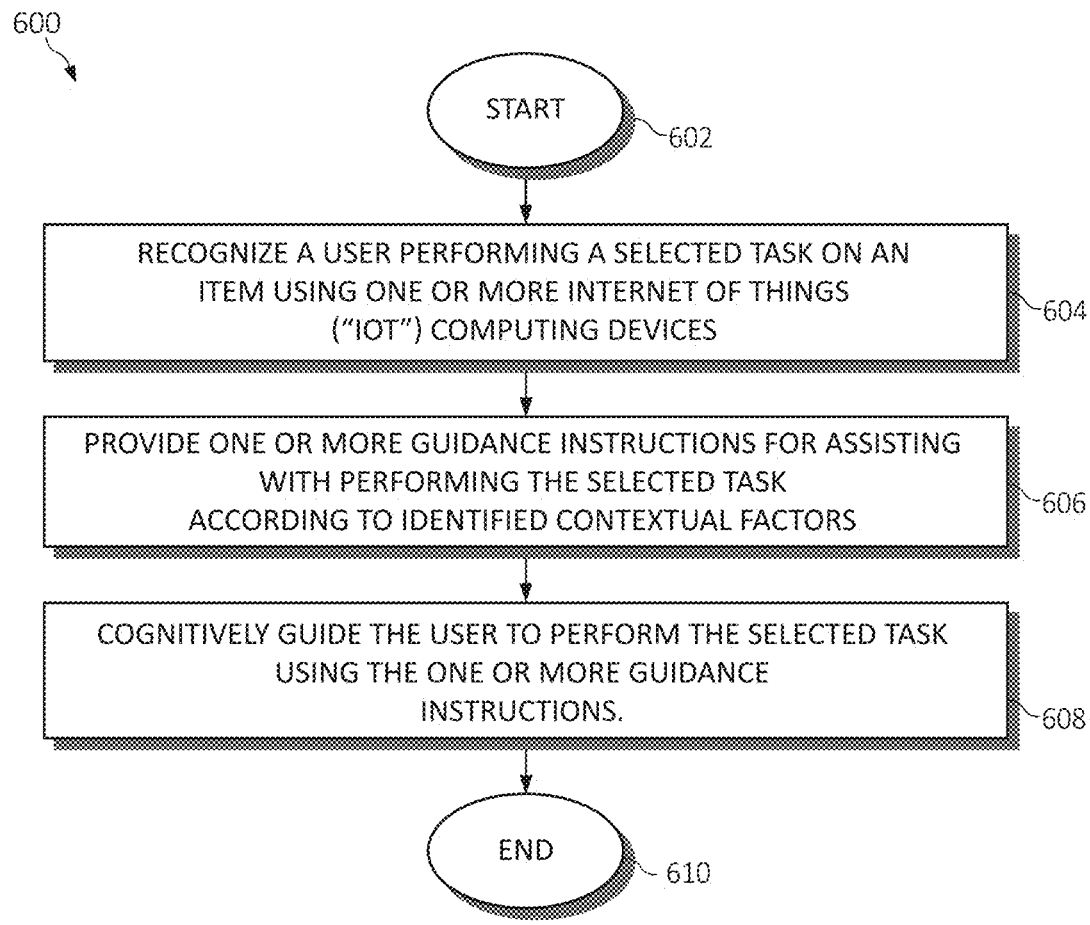
FIG. 6 is a flowchart diagram depicting an exemplary method for implementing an intelligent recommendation of guidance instructions to a user by a processor, again in which aspects of the present invention may be realized.

Turning now to FIG. 6, a method 600 for intelligent recommendation of guidance instructions to a user by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A user may be cognitively recognized performing a selected task on an item using one or more IoT computing devices, as in block 604. One or more guidance instructions may be provided/suggested for assisting with performing the selected task according to identified contextual factors, as in block 606. The user may be cognitively guided to perform the selected task using the one or more guidance instructions, as in block 608. The functionality 600 may end, as in block 610.

Figure 7:
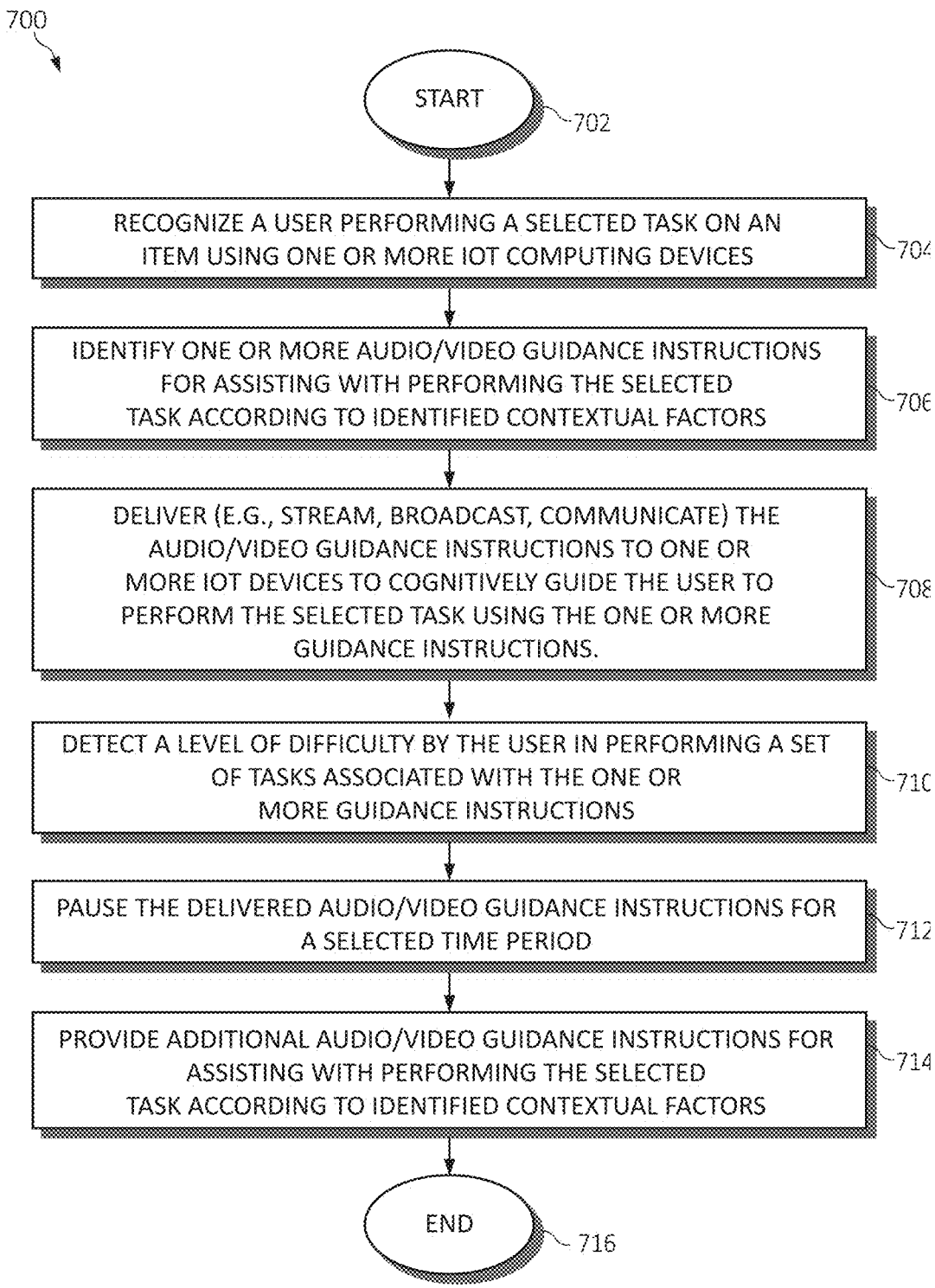
FIG. 7 is an additional flowchart diagram depicting an additional exemplary method for implementing an intelligent recommendation of guidance instructions to a user by a processor, again in which aspects of the present invention may be realized.

Turning now to FIG. 7, a method 700 for intelligent recommendation of guidance instructions to a user by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A user may be cognitively recognized performing a selected task on an item using one or more IoT computing devices, as in block 704. One or more audio/video guidance instructions (e.g., audio data and/or video data) may be identified for assisting with performing the selected task according to identified contextual factors, as in block 706. The audio/video guidance instructions may be delivered (e.g., real-time streaming, on-demand streaming, broadcasting, and/or communicating, etc.) to one or more IoT device to cognitively guide the user to perform the selected task using the one or more guidance instructions, as in block 708. A level of difficulty by the user in performing a set of tasks associated with the one or more guidance instructions, as in block 710. The delivered audio/video guidance instructions may be paused (e.g., stopped) for a selected time period, as in block 712. Additional audio/video guidance instructions may be provided for assisting with performing the selected task according to identified contextual factors, as in block 714. The functionality 700 may end, as in block 716.

In one aspect, in conjunction with and/or as part of at least one block of FIGS. 6-7, the operations of methods 600 and 700 may include each of the following. The operations of methods 600 and 700 may provide a sequence of guidance instructions retrieved from a domain knowledge, one or more online sources, a cloud computing system, a text corpus, or a combination thereof, and/or provides media data from one or more online sources, a cloud computing system, or a combination thereof. The performance of the one or more guidance instructions may be monitored while performing the selected task. Each step of the one or more guidance instructions may be verified (e.g., actions performed by the user may be compared to the instructions for determining accuracy of performance) for assisting with performing the selected task.

The operations of methods 600 and 700 may identify a level of difficulty by the user in performing a set of tasks associated with the one or more guidance instructions delivered via streamed media, and/or pause delivery of the streamed media for a selected period of times, and/or provide the user with a modified set of guidance instructions to guide the user through an enhanced level of instructions. The operations of methods 600 and 700 may provide additional guidance information relating to the guidance instructions collected from a domain knowledge, one or more online sources, a cloud computing system, a text corpus, or a combination thereof for performing the selected task.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent recommendation of guidance instructions by a processor, comprising:
    executing machine learning logic to train a neural network to recognize and classify a plurality of items in three-dimensional (3D) space using real-time image input of the plurality of items from one or more sensors of one or more Internet of Things (IoT) computing devices, wherein training the neural network includes training the neural network to match an item of the plurality of items with a known item in a known library of items comprised within a database according to a pixel-by-pixel feature extraction operation performed on the real-time image input, and wherein the trained neural network identifies the item using the pixel-by-pixel feature extraction operation by dividing
    the real-time image input into regions having predicted boundaries and weighting the predicted boundaries by one or more predicted probabilities that information contained within the predicted boundaries comprises at least a portion of the item;
    in conjunction with identifying the item, executing the machine learning logic to perform a visual surveillance and monitoring operation using the trained neural network to recognize a user is performing a selected task on the item according to movement information obtained in the real-time image input, wherein the recognizing is performed to identify the selected task such that the selected task is determined only after identifying the item and observing the user performing an activity with the item;

providing one or more guidance instructions for assisting with performing the selected task according to contextual factors identified while observing the user performing the activity with the item and associated with identifying the selected task, wherein providing the one or more guidance instructions includes determining, once the user has commenced the selected task, that the user is unable to continue performing the selected task as identified by the movement information obtained in the real-time image input, and retrieving additional guidance instructions from one or more ranked sources according to the determination; and cognitively guiding the user to perform the selected task using at least one of the one or more guidance instructions and the additional guidance instructions.

2. The method of claim 1, wherein providing one or more guidance instructions further includes providing a sequence of guidance instructions retrieved from a domain knowledge, one or more online sources, a cloud computing system, a text corpus, or a combination thereof.

3. The method of claim 1, wherein providing one or more guidance instructions further includes providing media data from one or more online sources, a cloud computing system, or a combination thereof.

4. The method of claim 1, further including monitoring performance of the one or more guidance instructions while the user is performing the selected task.

5. The method of claim 1, further including verifying each step of the one or more guidance instructions for assisting with performing the selected task.

6. The method of claim 1, further including:
identifying a level of difficulty by the user in performing a set of tasks associated with the one or more guidance instructions delivered via streamed media;
pausing delivery of the streamed media for a selected period of time;
providing the user with a modified set of guidance instructions to guide the user through an enhanced level of instructions.

7. The method of claim 1, further including providing the additional guidance instructions using information collected from a domain knowledge, one or more online sources, a cloud computing system, a text corpus, or a combination thereof for performing the selected task.

8. A system for intelligent recommendation of guidance instructions, comprising:
one or more computers with executable instructions that when executed cause the system to:
execute machine learning logic to train a neural network to recognize and classify a plurality of items in three-dimensional (3D) space using real-time image input of the plurality of items from one or more sensors of one or more Internet of Things (IoT) computing devices, wherein training the neural network includes training the neural network to match an item of the plurality of items with a known item in a known library of items comprised within a database according to a pixel-by-pixel feature extraction operation performed on the real-time image input, and wherein the trained neural network identifies the item using the pixel-by-pixel feature extraction operation by dividing
the real-time image input into regions having predicted boundaries and weighting the predicted boundaries by one or more predicted probabilities that information contained within the predicted boundaries comprises at least a portion of the item;
in conjunction with identifying the item, execute the machine learning logic to perform a visual surveillance and monitoring operation using the trained neural network to recognize a user is performing a selected task on the item according to movement information obtained in the real-time image input, wherein the recognizing is performed to identify the selected task such that the selected task is determined only after identifying the item and observing the user performing an activity with the item;
provide one or more guidance instructions for assisting with performing the selected task according to contextual factors identified while observing the user performing the activity with the item and associated with identifying the selected task, wherein providing the one or more guidance instructions includes determining, once the user has commenced the selected task, that the user is unable to continue performing the selected task as identified by the movement information obtained in the real-time image input, and retrieving additional guidance instructions from one or more ranked sources according to the determination; and
cognitively guide the user to perform the selected task using at least one of the one or more guidance instructions and the additional guidance instructions.

9. The system of claim 8, wherein, pursuant to re providing one or more guidance instructions, the executable instructions further provide a sequence of guidance instructions retrieved from a domain knowledge, one or more online sources, a cloud computing system, a text corpus, or a combination thereof.

10. The system of claim 8, wherein, pursuant to re providing one or more guidance instructions, the executable instructions further provide media data from one or more online sources, a cloud computing system, or a combination thereof.

11. The system of claim 8, wherein the executable instructions further monitor performance of the one or more guidance instructions while the user is performing the selected task.

12. The system of claim 8, wherein the executable instructions further verify each step of the one or more guidance instructions for assisting with performing the selected task.

13. The system of claim 8, wherein the executable instructions further:
identify a level of difficulty by the user in performing a set of tasks associated with the one or more guidance instructions delivered via streamed media;
pause delivery of the streamed media for a selected period of time;
provide the user with a modified set of guidance instructions to guide the user through an enhanced level of instructions.

14. The system of claim 8, wherein the executable instructions further provide the additional guidance instructions using information collected from a domain knowledge, one or more online sources, a cloud computing system, a text corpus, or a combination thereof for performing the selected task.

15. A computer program product for intelligent recommendation of guidance instructions by a processor, the computer program product comprising a non-transitory computer-readable storage medium having computer-readable program code portions stored therein, the computer-readable program code portions comprising:

an executable portion that executes machine learning logic to train a neural network to recognize and classify a plurality of items in three-dimensional (3D) space using real-time image input of the plurality of items from one or more sensors of one or more Internet of Things (IoT) computing devices, wherein training the neural network includes training the neural network to match an item of the plurality of items with a known item in a known library of items comprised within a database according to a pixel-by-pixel feature extraction operation performed on the real-time image input, and wherein the trained neural network identifies the item using the pixel-by-pixel feature extraction operation by dividing the real-time image input into regions having predicted boundaries and weighting the predicted boundaries by one or more predicted probabilities that information contained within the predicted boundaries comprises at least a portion of the item;

an executable portion that, in conjunction with identifying the item, executes the machine learning logic to perform a visual surveillance and monitoring operation using the trained neural network to recognize a user is performing a selected task on the item according to movement information obtained in the real-time image input, wherein the recognizing is performed to identify the selected task such that the selected task is determined only after identifying the item and observing the user performing an activity with the item;

an executable portion that provides one or more guidance instructions for assisting with performing the selected task according to contextual factors identified while observing the user performing the activity with the item and associated with identifying the selected task, wherein providing the one or more guidance instructions includes determining, once the user has commenced the selected task, that the user is unable to continue performing the selected task as identified by the movement information obtained in the real-time image input, and retrieving additional guidance instructions from one or more ranked sources according to the determination; and an executable portion that cognitively guides the user to perform the selected task using at least one of the one or more guidance instructions and the additional guidance instructions.

16. The computer program product of claim 15, further including, pursuant to providing one or more guidance instructions, an executable portion that provides a sequence of guidance instructions retrieved from a domain knowledge, one or more online sources, a cloud computing system, a text corpus, or a combination thereof.

17. The computer program product of claim 15, further including, pursuant to providing one or more guidance instructions, an executable portion that provides media data from one or more online sources, a cloud computing system, or a combination thereof.

18. The computer program product of claim 15, further including an executable portion that:

monitors performance of the one or more guidance instructions while the user is performing the selected task; and verifies each step of the one or more guidance instructions for assisting with performing the selected task.

19. The computer program product of claim 15, further including an executable portion that:

identifies a level of difficulty by the user in performing a set of tasks associated with the one or more guidance instructions delivered via streamed media;

pauses delivery of the streamed media for a selected period of time;

provides the user with a modified set of guidance instructions to guide the user through an enhanced level of instructions.

20. The computer program product of claim 15, further including an executable portion that provides the additional guidance instructions using information collected from a domain knowledge, one or more online sources, a cloud computing system, a text corpus, or a combination thereof for performing the selected task.

* * * * *